Oct. 5, 1965 A. G. ARENA 3,209,712
PORTABLE FUEL IGNITER
Filed Oct. 16, 1964 2 Sheets-Sheet 2
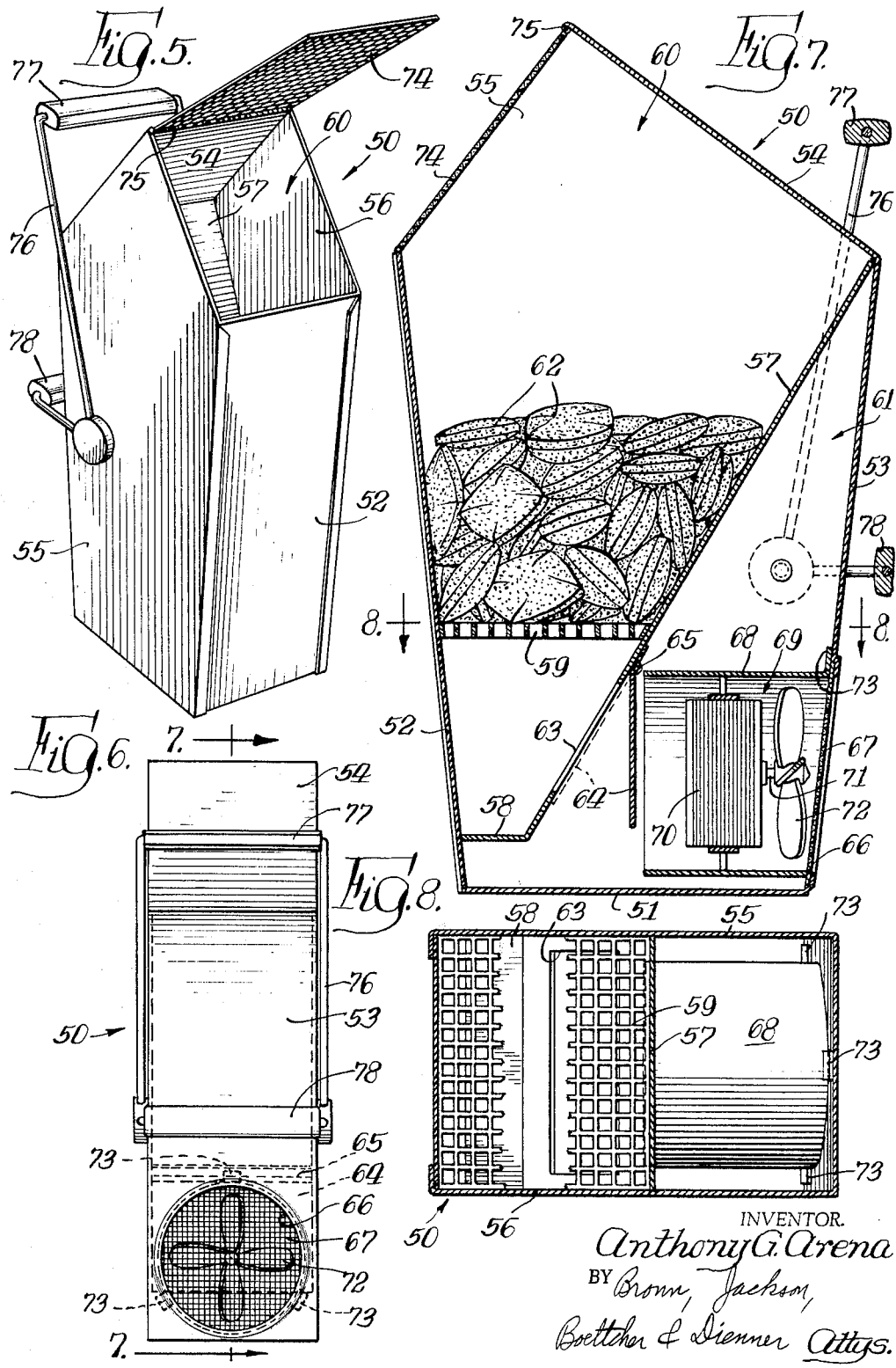
INVENTOR.
Anthony G. Arena
BY Brown, Jackson,
Boettcher & Dienner Attys.

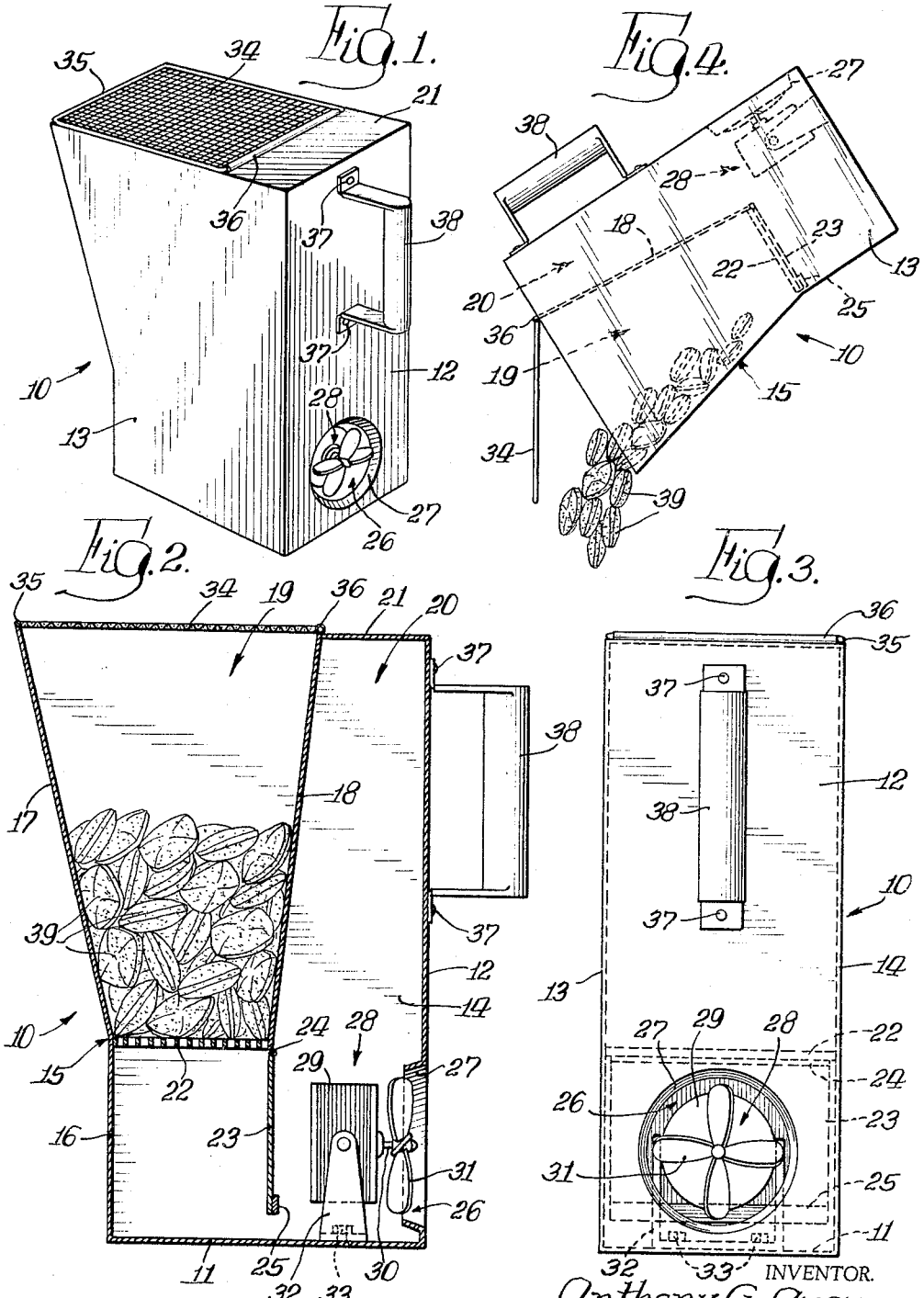

United States Patent Office 3,209,712
Patented Oct. 5, 1965

3,209,712
PORTABLE FUEL IGNITER
Anthony G. Arena, 2315 E. 96th St., Chicago, Ill.
Filed Oct. 16, 1964, Ser. No. 405,027
13 Claims. (Cl. 110—1)

This application is a continuation-in-part of my pending application, Serial No. 272,310, filed April 11, 1963, entitled Portable Fuel Igniter, and now abandoned.

My present invention relates generally to portable fuel igniters and more particularly to portable devices for rapidly igniting solid fuel such as charcoal and the like.

The practice of broiling or barbecuing food over a charcoal fire is well known. Quite commonly, the necessary charcoal fire is started in an outdoor brazier. The difficulty of initially igniting the charcoal lumps or briquets is the major problem of this type of cooking. Various methods are presently used for starting a charcoal fire. In some cases, a combustible igniter fluid is squirted on the charcoal briquets piled in the brazier, and the fluid is lighted with a match. The burning fluid gradually causes the charcoal to begin burning. In other cases, a combustible igniter paste is used in place of a fluid. In still other cases, an electric resistance element is placed within a pile of charcoal briquets and energized for heating the briquets to their kindling temperature. Portable hand blowers have also been proposed for increasing the rate of ignition of the charcoal. These methods of starting a charcoal fire have proved unsatisfactory. With present methods, burning of the charcoal within the pile begins too slowly and unevenly. Moreover, the use of fluids and pastes is messy and hazardous.

The primary object of my present invention is to expedite the preparation of a charcoal fire for cooking purposes.

It is another object of my present invention to provide a portable fuel igniter in which a pile or charge of charcoal briquets may be rapidly ignited and from which the ignited fuel may be conveniently transferred to a hearth or fire bowl of a brazier or other charcoal cooker.

In accomplishing these objects, I propose to provide a potable device comprising a housing having a vertically extending fuel chamber therein with a grate arranged at the lower end of the chamber for supporting an ignition material and a charge of solid fuel, such as charcoal briquets. Air suction means is mounted within the housing adjacent an air inlet for drawing air therethrough and directing the same under pressure through the grate and the fuel chamber thereby causing the ignition material to ignite the solid fuel. With the described portable fuel igniter of my present invention, all charcoal briquets in the fuel chamber are rapidly and evenly ignited in a matter of minutes. The burning charcoal briquets, which are then emptied from the fuel chamber into a charcoal cooker, are immediately ready for cooking. Charcoal may be ignited with my device even though it is damp or wet.

It is another object of my present invention to provide a portable fuel igniter, as described, wherein tilting of the same for emptying the ignited charge of fuel therefrom is facilited by handle means mounted on the housing and insulated from the fuel chamber. In this connection, a vertically extending air chamber is arranged within the housing intermediate of the fuel chamber and the handle. The air in the air chamber serves to insulate the handle from the heat developed in the fuel chamber during ignition of the solid fuel therein.

It is a further object of my present invention to provide a portable fuel igniter, as described, wherein a screen is pivotally mounted at the upper end of the fuel chamber and normally lies across the open upper end portion thereof for arresting the emission of sparks therefrom. The pivotal mounting of the screen permits the same to swing away from the upper end of the fuel chamber as the igniter is tilted to permit the egress of fuel therefrom.

It is a still further object of my present invention to provide a portable fuel igniter, as described, wherein a damper plate is suspended at the lower end of the fuel chamber and is arranged to pivot toward the grate, whereby either in one embodiment to engage and directly close off the grate or in another embodiment to close off an air passageway leading to the grate, as the igniter is tilted to arrest the backflow of gases from the fuel chamber.

As a feature of my present invention, the air suction means is located at one side of the fuel chamber out of coincidence with the direct flow path of any heat and sparks passing downwardly through the grate.

Still another object of my present invention is to provide an alternative embodiment of portable fuel igniter wherein the air suction means is mounted within a cylindrical tube which serves as a heat shield for the motor of the air suction means and which cooperates with the damper plate in such a manner as to increase the velocity of air travelling through the grate.

Now in order to acquaint those skilled in the art with the manner of constructing and using a portable fuel igniter in accordance with the principles of my present invention, I shall describe in connection with the accompanying drawing preferred embodiments of my invention.

In the drawings:

FIGURE 1 is a perspective view of one embodiment of portable fuel igniter of my present invention;

FIGURE 2 is a vertical median sectional view, on an enlarged scale, of the portable fuel igniter of FIGURE 1;

FIGURE 3 is a rear elevational view, on an enlarged scale, of the portable fuel igniter of FIGURE 1;

FIGURE 4 is a side elevational view of the portable fuel igniter of FIGURE 1 in a tilted position;

FIGURE 5 is a perspective view of another embodiment of portable fuel igniter of my present invention;

FIGURE 6 is a rear elevational view of the portable fuel igniter of FIGURE 5;

FIGURE 7 is an enlarged vertical median sectional view, taken substantially along the line 7—7 in FIGURE 6, looking in the direction indicated by the arrows; and FIGURE 8 is a horizontal sectional view, with the central portion of the grate being interrupted to illustrate parts therebelow, taken substantially along the line 8—8 in FIGURE 7, looking in the direction indicated by the arrows.

Referring now to FIGURES 1 through 4, there is indicated generally by the reference numeral 10 one embodiment of portable fuel igniter of my present invention. The fuel igniter 10 comprises a housing having a horizontal rectangular bottom wall 11, a vertical rear wall 12, vertical side walls 13 and 14, and a front wall 15 with a lower vertical portion 16 and an upper portion 17 lying in a plane inclined away from the rear wall 12. As illustrated in FIGURES 1 through 4, the upper edges of the rear wall 12, side walls 13 and 14, and front wall 15 lie substantially in a common horizontal plane when the fuel igniter 10 is in an upright position. By way of example, the described housing walls may be fabricated of sheet metal, and may be suitably secured along their adjoining edges by means of welding, brazing or the like.

Extending transversely of the housing side walls 13 and 14, and suitably secured thereto as by welding, is a baffle plate 18 that preferably lies in a plane inclined toward the rear wall 12. As best shown in FIGURE 2, the upper edge of the baffle plate 18 lies substantially in the plane of the upper edges of the rear wall 12, side walls 13 and 14, and front wall 15, and the lower edge of the baffle plate 18 is spaced above the bottom wall 11.

The front wall 15, baffle plate 18 and side walls 13 and 14 define a vertically extending fuel chamber 19. Correspondingly, the rear wall 12, baffle plate 18, and side walls 13 and 14 define a vertically extending air chamber 20. A horizontal closure plate 21 is suitably secured along its edges to the adjacent edges of the rear wall 12, side walls 13 and 14, and baffle plate 18 at the upper end of the air chamber 20.

A rectangular grate 22, which may be formed of expanded metal sheet or similar metal grid material, is mounted along its edges to the front wall 15, baffle plate 18 and side walls 13 and 14 in the fuel chamber 19 at the lower end thereof. In the specific embodiment of my invention disclosed in FIGURES 1 through 4, the grate 22 lies substantially in a horizontal plane passing through the lower edge of the baffle plate 18. As will be described more fully hereinafter, the grate 22 serves to support an ignition material and a charge of solid fuel within the fuel chamber 19. A rectangular damper plate 23, which corresponds substantially in size and shape to the grate 22, is pivotally mounted along one edge, as at 24, to the lower edge of the baffle plate 18. A weight 25, which may take the form of an iron strap, is suitably secured to the lower portion of the damper plate 23. The damper plate 23 normally hangs suspended, as shown in FIGURE 2, in a substantially vertical plane with its lower horizontal edge spaced above the bottom wall 11.

Formed in the rear wall 12 adjacent the lower end thereof is an air inlet opening 26 surrounded by an inwardly extending annular shroud 27. Air suction means, indicated generally by the reference numeral 28, is mounted within the fuel igniter housing intermediate of the rear wall 12 and the damper plate 23 adjacent the air inlet 26. The air suction means 28 may, for example, comprise an electric motor 29 having a drive shaft 30 on which is mounted a propeller fan 31. The motor 29 may be supported at its opposite sides in the upper ends of a U-shaped bracket 32 secured, as by stud bolts 33, to the bottom housing wall 11. Current for operating the motor 29 may be obained from a conventional power line, batteries or rechargeable cells. When the electric motor 29 is energized and the propeller fan 31 is rotated, air is drawn through the air inlet 26 and is directed under pressure past the lower extremity of the damper plate 23 and upwardly through the grate 22 and the fuel chamber 19. The motor-driven propeller fan assembly 28 causes a relatively large volume air flow at low pressure.

It will be observed that the air suction means 28 is located at one side of the fuel chamber 19 out of coincidence with the direct flow of any heat and sparks passing downwardly through the grate 22. Also, during the flow of air as described, the weight 25 secured to the damper plate 23 serves to maintain the latter in its normal depending position where it acts to shield the air suction means 28 from the radiant heat passing through the grate 22 from the fuel chamber 19. A rectangular screen 34, which is supported in a wire frame 35, is pivotally mounted along one edge, as at 36, to the upper edge of the baffle plate 18. The screen 34 normally lies across the upper end of the fuel chamber 19 for arresting the emission of sparks therefrom. The pivotal mounting of the screen 34 permits the latter to swing away from the upper end of the fuel chamber 19 as the fuel igniter 10 is tilted to allow the egress of fuel therefrom.

Mounted on the outboard side of the rear wall 12, as by rivets 37, is a generally C-shaped handle 38. The handle 38 is adapted to be manually grasped for transporting the fuel igniter 10 from one location to another and for tilting the same so as to empty fuel from the fuel chamber 19. It will be noted that the vertically extending air chamber 20 is arranged intermediate of the fuel chamber 19 and the handle 38; air within the chamber 20 serves to insulate the handle 38 from the heat developed in the fuel chamber 19.

In the operation of the portable fuel igniter 10 of my present invention, the screen 34 is first swung away from the upper end of the fuel chamber 19. Then, an ignition material such as an ignited piece of paper is placed on the grate 22 within the fuel chamber 19. Next, the burning paper is covered with a pile or charge of solid fuel 39 in the amount desired. Th solid fuel 39 may for example be charcoal in granular, lump or briquet form. Finally, the screen 34 is swung back to its normal position across the upper end of the fuel chamber 19, and the motor 29 is energized for effecting rotation of the propeller fan 31. The air which is drawn in by the air suction means 28 through the air inlet 26 is, as previously described, forced under low pressure past the lower extremity of the damper plate 23 and is then directed upwardly through the grate 22 and the fuel chamber 19 thereby causing the ignition material to ignite the solid fuel 39. In a matter of minutes, all of the charcoal briquets in the fuel chamber 19 will be evenly ignited and ready for use. At this time, the motor 29 is de-energized and the fuel igniter 10 is transported to the location of the brazier or other charcoal cooker. The fuel igniter 10 is then tilted, for example, from the position shown in FIGURE 1 to the position shown in FIGURE 4. The screen 34 will swing away from the upper end of the fuel chamber 19 thereby permitting the charcoal briquets 39 to flow from the fuel chamber 19 into the brazier. At the same time, the damper plate 23 will pivot toward and into engagement with the underside of the grate 22 to arrest the backflow of hot gases from the fuel chamber 19 thereby protecting the air suction means 28 against undesirable heat blast. After the fuel chamber 19 as been emptied, the fuel igniter 10 may be returned to its normal upright position.

Referring now to FIGURES 5 through 8, there is indicated generally by the reference numeral 50 another embodiment of portable fuel igniter of my present invention. The fuel igniter 50 comprises a housing having a horizontal rectangular bottom wall 51, generally vertically extending divergent front and rear walls 52 and 53, a hood portion 54 extending forwardly and upwardly from the rear wall 53, and vertical side walls 55 and 56 having triangular upper end portions. The described housing may, by way of illustration, be fabricated of sheet metal suitably formed in one or more pieces secured along their free edges by means of welding, brazing or the like.

Extending transversely between the housing side walls 55 and 56 and diagonally downwardly from the rear wall 53 adjacent the hood portion 54 to the front wall 52 adjacent the bottom wall 51 is a baffle plate 57 and closure foot portion 58 which may be secured in position by welding. A horizontal rectangular grate 59, which may be formed of expanded metal sheet or similar metal grid material, is mounted along its edges to the front wall 52, baffle plate 57, and side walls 55 and 56. The front wall 52, baffle plate 57, side walls 55 and 56, hood portion 54 and grate 59 define a vertically extending fuel chamber 60. Correspondingly, the rear wall 53, baffle plate 57 and side walls 55 and 56 define a vertically extending air chamber 61. The grate 59 serves to support an ignition material and a charge of solid fuel 62 within the fuel chamber 60.

Formed through the baffle plate 57 below the plane of the grate 59 is a rectangular air passageway 63. A rectangular damper plate 64, which is slightly larger in size than the air passageway 63, is pivotally mounted along one horizontal edge, as at 65, to the baffle plate 57 adjacent the lower end of the fuel chamber 60 immediately above the air passageway 63. If desired, the damper plate 64 may be weighted along its lower edge. Formed in the rear wall 53 adjacent the lower end thereof is an air inlet 66 covered by a protective screen 67. A horizontal cylindrical tube 68 has an outer end secured about the periphery of the air inlet 66 and has an inner vertical end facing in the direction of the baffle plate 57. The damper plate 64 normally hangs suspended, as shown in FIGURE 7, in a substantially vertical plane adjacent the inner end of the cylindrical tube 68 and is so dimensioned that its lower edge is spaced above the lower edge of the cylindrical tube 68.

Air suction means, indicated generally by the reference numeral 69, is mounted within the cylindrical tube 68 intermediate of the ends thereof. The air suction means 69 may, for example, comprise an electric motor 70 having a drive shaft 71 on which is mounted a propeller fan 72. The motor 70 may be supported by circumferentially spaced radial flanges 73 secured to the inner periphery of the tube 68. Current for operating the motor 70 may be obtained from a conventional power line, batteries or rechargeable cells. When the electric motor 70 is energized and the propeller fan 72 is rotated, air is drawn through the air inlet 67 and is directed under pressure past the lower extremity of the damper plate 64 and upwardly through the air passageway 63, the grate 59 and the fuel chamber 60.

The air suction means 69 is located at one side of the fuel chamber 60 out of coincidence with the direct flow of any heat and sparks passing downwardly through the grate 59. Also, the damper plate 64 and the cylindrical tube 68 serve to shield the air suction means 69 from the heat emanating from the fuel chamber 60. A rectangular screen 74, for example of stainless steel, is pivotally mounted along one edge, as at 75, to the forward edge of the hood portion 54. The screen 74 normally lies across the open upper end of the fuel chamber 60 for arresting the emission of sparks therefrom. The pivotal mounting of the screen 74 permits the latter to swing away from the upper end of the fuel chamber 60 as the fuel igniter 50 is tilted to allow the egress of fuel therefrom. Suitably mounted on the outboard sides of the side walls 55 and 56 is a handle assembly 76 having hand grips 77 and 78 which are adapted to be manually grasped for transporting the fuel igniter 50 from one location to another and for tilting the same so as to empty fuel from the fuel chamber 60. Air within the chamber 61 serves to insulate the handle assembly from the heat developed in the fuel chamber 60.

In the operation of the portable fuel igniter 50 of my present invention, the screen 74 is first swung away from the open upper end of the fuel chamber 60. Then, an ignition material such as an ignited piece of paper is placed on the grate 59 within the fuel chamber 60. Next, the burning paper is covered with a pile or charge of solid fuel 62 in the amount desired. Alternatively, the paper may be ignited after being covered with solid fuel 62. The solid fuel 62 may, by way of illustration, be charcoal in granular, lump or briquet form. Finally, the screen 74 is swung back to its normal position across the open upper end of the fuel chamber 60, and the motor 70 is energized for effecting rotation of the propeller fan 72. The air which is drawn in by the air suction means 69 through the air inlet 66 is forced under pressure past the lower extremity of the damper plate 64 and is then directed upwardly through the air passageway 63, the grate 59 and the fuel chamber 60 thereby causing the ignition material to ignite the solid fuel 62. The tube 68, and the damper plate 64 which constricts the flow of air therethrough, together serve as a venturi assembly for increasing the velocity of the air directed through the grate 59 whereby to increase the rate of ignition of the solid fuel 62. In a matter of minutes, all of the charcoal briquets in the fuel chamber 60 are evenly ignited and ready for use. At this time, the motor 70 is de-energized and the fuel igniter 50 is transported to the location of the brazier or other charcoal cooker. The fuel igniter 50 is then tilted forwardly and, as the screen 74 swings away from the upper end of the fuel chamber 60, the charcoal briquets 62 are permitted to flow from the fuel chamber 60 into the brazier. At the same time, the damper plate 64 pivots toward and into engagement with the baffle plate 57 closing off the air passageway 63. Thus, communication between the grate 59 and air suction means 69 is blocked as the igniter 50 is tilted to arrest the backflow of hot gases from the fuel chamber 60 thereby protecting the air suction means 69 against undesirable heat blast. After the fuel chamber 60 has been emptied, the fuel igniter 50 is returned to its normal upright position.

While I have shown and described what I believe to be preferred embodiments of my present invention, it will be understood by those skilled in the art that various modifications and rearrangements may be made therein without departing from the spirit and scope of my invention.

I claim:

1. A portable fuel igniter comprising a housing having a fuel chamber therein, a grate mounted in said fuel chamber, said grate adapted to support an ignition material and a charge of solid fuel within said fuel chamber, said housing having an air inlet, air suction means mounted entirely within said housing adjacent said air inlet for drawing air therethrough and directing the same under pressure through said grate and said fuel chamber thereby causing the ignition material to ignite the solid fuel, a damper plate pivotally mounted at the lower end of said fuel chamber and normally being suspended in a vertical position within said housing, said igniter being tiltable so as to empty the ignited charge of fuel therefrom, and said damper plate pivoting toward said grate as said igniter is tilted to arrest the backflow of gases from said fuel chamber.

2. The portable fuel igniter of claim 1 characterized by the provision of a screen pivotally mounted at the upper end of said fuel chamber, said screen normally lying across the upper end of said fuel chamber for arresting the emission of sparks therefrom, and said screen pivoting away from the upper end of said fuel chamber as said igniter is tilted to permit the egress of fuel therefrom.

3. The portable fuel igniter of claim 1, wherein said air suction means is located at one side of said fuel chamber out of coincidence with said grate.

4. A portable fuel igniter comprising a housing having a vertically extending fuel chamber and a vertically extending air chamber, a grate mounted at the lower end of said fuel chamber, said grate adapted to support an ignition material and a charge of solid fuel within said fuel chamber, said housing having an air inlet, air suction means mounted entirely within said housing adjacent said air inlet for drawing air therethrough and directing the same under pressure through said grate and said fuel chamber thereby causing the ignition material to ignite the solid fuel, a damper plate pivotally mounted adjacent the lower end of said fuel chamber and normally being suspended in a vertical position, a handle mounted on said housing whereby said igniter may be tilted so as to empty the ignited charge of fuel therefrom, the air in said air chamber insulating said handle from the heat developed in said fuel chamber, and said damper plate pivoting toward said grate as said igniter is tilted to arrest the backflow of hot gases from said fuel chamber.

5. The portable fuel igniter of claim 4 characterized by the provision of a screen pivotally mounted at the upper end of said fuel chamber, said screen normally lying across the upper end of said fuel chamber for arresting the emission of sparks therefrom, and said screen pivoting away from the upper end of said fuel chamber as said igniter is tilted to permit the egress of fuel therefrom.

6. A portable fuel igniter comprising a bottom wall, a rear wall, side walls, a front wall, said front, rear and side walls having upper edges lying substantially in a common horizontal plane, a transverse baffle plate secured to said side walls, said baffle plate having an upper edge lying substantially in the plane of the upper edges of said front, rear and side walls and having a lower horizontal edge spaced above said bottom wall, said front wall, baffle plate and side walls defining a fuel chamber, said rear wall, baffle plate and side walls defining an air chamber, a grate mounted along its edges to said front wall, baffle plate and side walls, said grate adapted to support an ignition material and a charge of solid fuel within said fuel chamber, said rear wall having an air inlet in the lower portion thereof, air suction means mounted entirely within the confines of said front, rear and side walls adjacent said air inlet for drawing air therethorugh and directing the same under pressure through said grate and said fuel chamber thereby causing the ignition material to ignite the solid fuel, a handle mounted on said rear wall whereby said igniter may be tilted so as to empty the ignited charge of fuel therefrom, and the air in said air chamber insulating said handle from the heat developed in said fuel chamber.

7. A portable fuel igniter comprising a horizontal bottom wall, a vertical rear wall, vertical side walls, a front wall having a lower vertical portion and an upper portion lying in a plane inclined away from said rear wall, said front, rear and side walls having upper edges lying substantially in a common horizontal plane, a transverse baffle plate secured to said side walls and lying in a plane inclined toward said rear wall, said baffle plate having an upper edge lying substantially in the plane of the upper edges of said front, rear and side walls and having a lower horizontal edge spaced above said bottom wall, said front wall, baffle plate and side walls defining a vertically extending fuel chamber, said rear wall, baffle plate and side walls defining a vertically extending air chamber, a horizontal closure plate secured at the upper end of said air chamber, a grate mounted along its edges to said front wall, baffle plate and side walls and lying substantially in a horizontal plane passing through the lower edge of said baffle plate, said grate adapted to support an ignition material and a charge of solid fuel within said fuel chamber, said rear wall having an air inlet in the lower portion thereof, air suction means mounted entirely within the confines of said front, rear and side walls adjacent said air inlet for drawing air therethrough and directing the same under pressure through said grate and said fuel chamber thereby causing the ignition material to ignite the solid fuel, a handle mounted on said rear wall whereby said igniter may be tilted so as to empty the ignited charge of fuel therefrom, and the air in said air chamber insulating said handle from the heat developed in said fuel chamber.

8. A portable fuel igniter comprising a horizontal rectangular bottom wall, a vertical rear wall, vertical side walls, a front wall having a lower vertical portion and an upper portion lying in a plane inclined away from said rear wall, said front, rear and side walls having upper edges lying substantially in a common horizontal plane, a transverse baffle plate secured to said side walls and lying in a plane inclined toward said rear wall, said baffle plate having an upper edge lying substantially in the plane of the upper edges of said front, rear and side walls and having a lower horizontal edge spaced above said bottom wall, said front wall, baffle plate and side walls defining a vertically extending fuel chamber, said rear wall, baffle plate and side walls defining a vertically extending air chamber, a horizontal closure plate secured at the upper end of said air chamber, a rectangular grate mounted along its edges to said front wall, baffle plate and side walls and lying substantially in a horizontal plane passing through the lower edge of said baffle plate, said grate adapted to support an ignition material and a charge of solid fuel within said fuel chamber, a rectangular damper plate corresponding substantially in size to said grate and being pivotally mounted along one edge to the lower edge of said baffle plate, said damper plate normally being suspended in a substantially vertical plane with its lower edge spaced above said bottom wall, said rear wall having an air inlet in the lower portion thereof, a motor-driven propeller fan assembly mounted intermediate of said rear wall and said damper plate adjacent said air inlet for drawing air therethrough and directing the same under pressure past the lower extremity of said damper plate and upwardly through said grate and said fuel chamber thereby causing the ignition material to ignite the solid fuel, a rectangular screen pivotally mounted at one edge along the upper edge of said baffle plate and normally lying across the upper end of said fuel chamber for arresting the emission of sparks therefrom, a handle mounted on said rear wall whereby said igniter may be tilted so as to empty the ignited charge of fuel therefrom, said screen pivoting away from the upper end of said fuel chamber as said igniter is tilted to permit the egress of fuel therefrom, said damper plate pivoting toward said grate as said igniter is tilted to arrest the backflow of hot gases from said fuel chamber, and the air in said air chamber insulating said handle from the heat developed in said fuel chamber.

9. A portable fuel igniter comprising a housing having a vertically extending fuel chamber therein, a grate mounted in said fuel chamber, said grate adapted to support an ignition material and a charge of solid fuel within said fuel chamber, said housing having an air inlet, air suction means mounted within said housing adjacent said air inlet for drawing air therethrough and directing the same under pressure through said grate and said fuel chamber thereby causing the ignition material to ignite the solid fuel, a pivotally mounted damper plate normally suspended in a substantially vertical plane within said housing, said igniter being tiltable so as to empty the ignited charge of fuel therefrom, and said damper plate pivoting to a position blocking communication between said grate and said air suction means as said igniter is tilted to arrest the backflow of gases from said fuel chamber.

10. A portable fuel igniter comprising a housing having a fuel chamber therein, a grate mounted in said fuel chamber, said grate adapted to support an ignition material and a charge of solid fuel within said fuel chamber, said housing having an air inlet, a tube having one end at said air inlet and the other end facing said grate, a pivotally mounted damper plate normally suspended in a substantially vertical plane adjacent said other end of said tube, air suction means mounted within said tube for drawing air through said air inlet and directing the same under pressure past said damper plate and through said grate and fuel chamber thereby causing the ignition material to ignite the solid fuel, said igniter being tiltable so as to empty the ignited charge of fuel therefrom, and said damper plate pivoting to a position blocking communication between said grate and said air suction means as said igniter is tilted to arrest the backflow of gases from said fuel chamber.

11. A portable fuel igniter comprising a housing, a transverse baffle plate and a grate mounted in said housing and defining therewith a vertically extending fuel chamber, said grate adapted to support an ignition material and a charge of solid fuel within said fuel chamber, said housing having an air inlet in the lower portion thereof, a tube having an outer end at said inlet and having an inner end facing in the direction of said baffle plate, said baffle plate having an air passageway formed therethrough below the plane of said grate, a pivotally mounted damper plate normally suspended in a substantially vertical plane adjacent said inner end of said tube with its lower edge spaced above the lower edge of said tube, air suction means mounted within said tube intermediate of the ends thereof for drawing air through said air inlet and directing the same under pressure past said damper plate and upwardly through said air passageway, said grate and said fuel chamber thereby causing the ignition material to ignite the solid fuel, said igniter being tiltable so as to empty the ignited charge of fuel therefrom, and said damper plate pivoting toward said air passageway as said igniter is tilted to arrest the back flow of hot gases from said fuel chamber through said air passageway.

12. A portable fuel igniter comprising a bottom wall, front and rear walls with said rear wall having a hood portion, side walls, a transverse baffle plate extending between said side walls and diagonally downwardly from said rear wall adjacent said hood portion to said front wall adjacent said bottom wall, a horizontal grate mounted along its edges to said front wall, baffle plate and side walls, said front wall, baffle plate, side walls, hood portion and grate defining a vertically extending fuel chamber, said grate adapted to support an ignition material and a charge of solid fuel within said fuel chamber, said rear wall having an air inlet in the lower portion thereof, a horizontal tube having an outer end secured about the periphery of said inlet and having an inner end facing in the direction of said baffle plate, said baffle plate having an air passageway formed therethrough below the plane of said grate at the approximate level of said tube, a damper plate pivotally mounted along one edge to said baffle plate, said damper plate normally being suspended in a substantially vertical plane adjacent said inner end of said tube with its lower edge spaced above the lower edge of said tube, a motor-driven propeller fan assembly mounted within said tube intermediate of the ends thereof for drawing air through said air inlet and directing the same under pressure past the lower extremity of said damper plate and upwardly through said air passageway, said grate and said fuel chamber thereby causing the ignition material to ignite the solid fuel, a pivotally mounted screen normally lying across the open upper end of said fuel chamber for arresting the emission of sparks therefrom, a handle mounted on said igniter whereby the latter may be tilted so as to empty the ignited charge of fuel therefrom, said screen pivoting away from the upper end of said fuel chamber as said igniter is tilted to permit the egress of fuel therefrom, and said damper plate pivoting toward said air passageway as said igniter is tilted to arrest the back flow of hot gases from said fuel chamber through said air passageway.

13. A portable fuel igniter comprising a horizontal rectangular bottom wall, generally vertically extending divergent front and rear walls with said rear wall having a forwardly and upwardly extending hood portion, vertical side walls having triangular upper end portions, a transverse baffle plate extending between said side walls and diagonally downwardly from said rear wall adjacent said hood portion to said front wall adjacent said bottom wall, a horizontal rectangular grate mounted along its edges to said front wall, baffle plate and side walls, said front wall, baffle plate, side walls, hood portion and grate defining a vertically extending fuel chamber, said grate adapted to support an ignition material and a charge of solid fuel within said fuel chamber, said rear wall having a circular air inlet in the lower portion thereof, a horizontal cylindrical tube having an outer end secured about the periphery of said inlet and having an inner vertical end facing in the direction of said baffle plate, said baffle plate having a rectangular air passageway formed therethrough below the plane of said grate at the approximate level of said cylindrical tube, a rectangular damper plate pivotally mounted along one horizontal edge to said baffle plate, said damper plate normally being suspended in a substantially vertical plane adjacent said inner end of said cylindrical tube with its lower edge spaced above the lower edge of said cylindrical tube, a motor-driven propeller fan assembly mounted within said cylindrical tube intermediate of the ends thereof for drawing air through said air inlet and directing the same under pressure past the lower extremity of said damper plate and upwardly through said air passageway, said grate and said fuel chamber thereby causing the ignition material to ignite the solid fuel, a rectangular screen pivotally mounted at one edge along the forward edge of said hood portion and normally lying across the open upper end of said fuel chamber for arresting the emission of sparks therefrom, a handle mounted on said igniter whereby the latter may be tilted so as to empty the ignited charge of fuel therefrom, said screen pivoting away from the upper end of said fuel chamber as said igniter is tilted to permit the egress of fuel therefrom, and said damper plate pivoting toward said air passageway as said igniter is tilted to arrest the back flow of hot gases from said fuel chamber through said air passageway.

References Cited by the Examiner

UNITED STATES PATENTS

| | | |
|---|---|---|
| 1,116,473 | 11/14 | Oberle. |
| 1,630,393 | 5/27 | Ledden _____ 110—18 |
| 1,639,642 | 8/27 | Law _____ 110—75 |
| 1,970,727 | 8/34 | Bates _____ 110—19 |
| 2,058,254 | 10/36 | Pederson. |
| 2,121,514 | 6/38 | Waterman _____ 110—18 |
| 2,523,933 | 9/50 | Akester et al. _____ 98—39 X |
| 2,527,934 | 10/50 | Jefferies _____ 110—18 X |
| 2,693,774 | 11/54 | Knowles _____ 110—18 |
| 2,734,441 | 2/56 | Williams _____ 98—1 |
| 3,060,868 | 10/62 | MacLachlan _____ 110—1 |
| 3,147,367 | 9/64 | Magnusson. |
| 3,159,119 | 12/64 | Hottenroth et al. _____ 126—25 X |

FOREIGN PATENTS 91,814 12/21 Switzerland.

FREDERICK L. MATTESON, Jr., *Primary Examiner.*
ROBERT A. DUA, *Examiner.*